L. B. WELCH.
CONVERTIBLE SEAT FOR AUTOMOBILES.
APPLICATION FILED APR. 1, 1920. RENEWED MAR. 19, 1921.
1,387,083.
Patented Aug. 9, 1921.
2 SHEETS—SHEET 2.
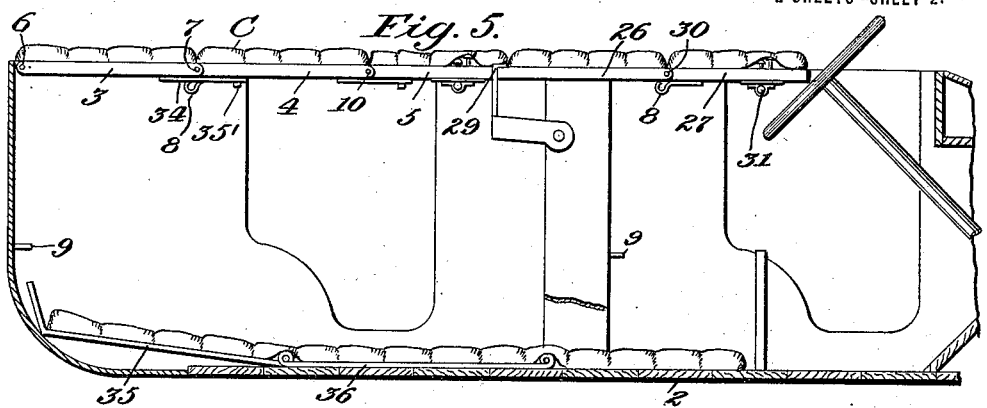
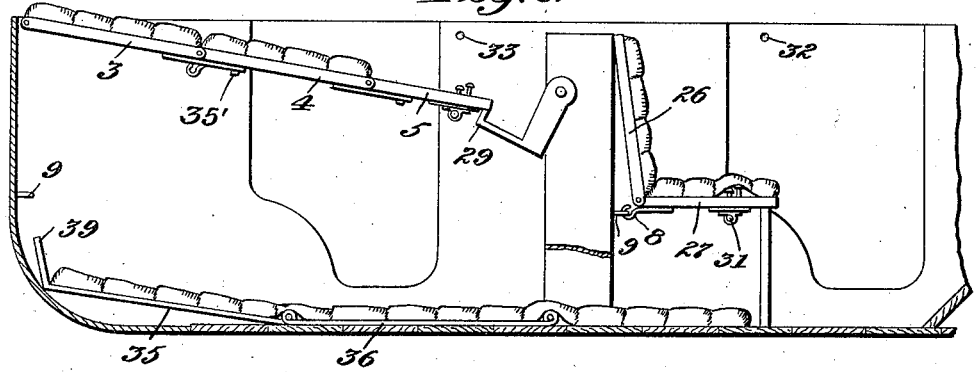
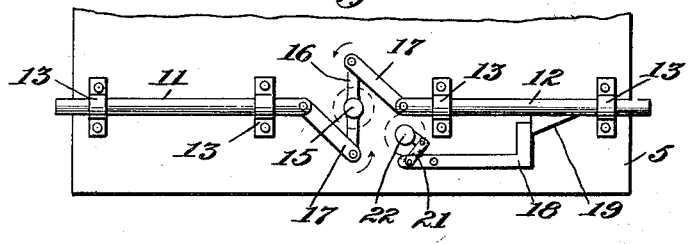
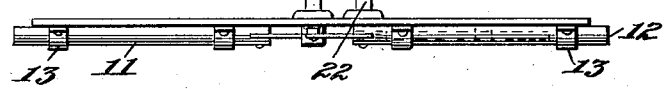
Inventor:
Lorenzo B. Welch,
Fenelon B. Brock
Atty.

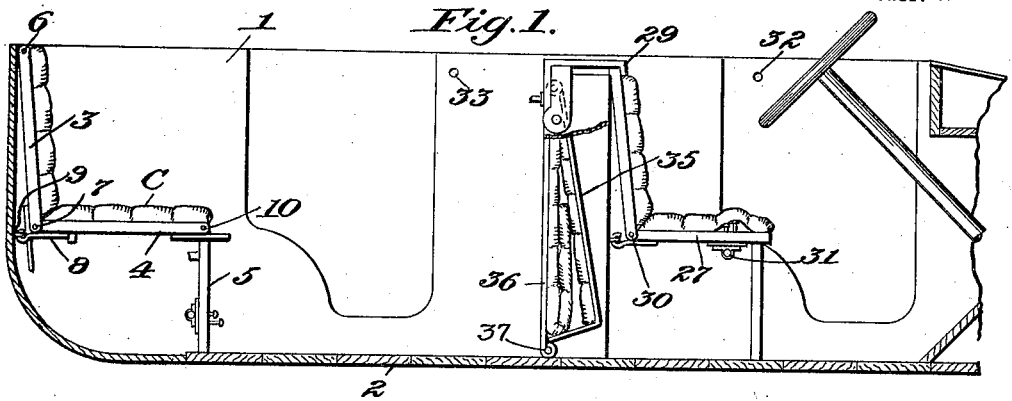
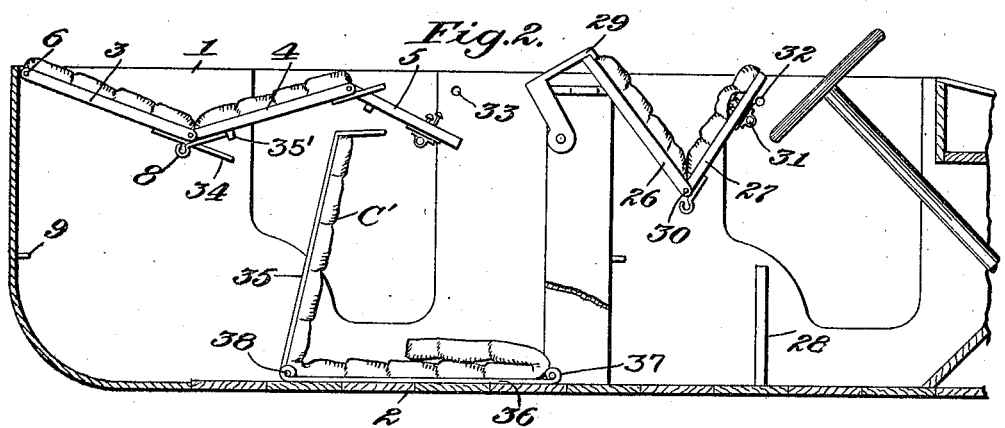
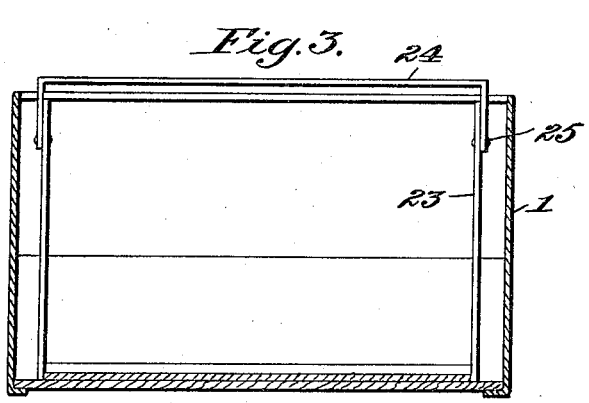
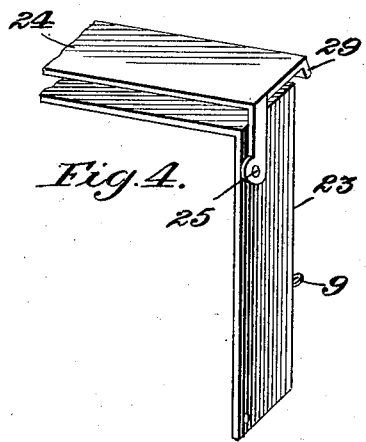

UNITED STATES PATENT OFFICE.

LORENZO B. WELCH, OF FORT SMITH, ARKANSAS.

CONVERTIBLE SEAT FOR AUTOMOBILES.

1,387,083. Specification of Letters Patent. Patented Aug. 9, 1921.

Application filed April 1, 1920, Serial No. 370,368. Renewed March 19, 1921. Serial No. 453,712.

*To all whom it may concern:*

Be it known that I, LORENZO B. WELCH, a citizen of the United States, residing at Fort Smith, in the county of Sebastian and State of Arkansas, have invented new and useful Improvements in Convertible Seats for Automobiles, of which the following is a specification.

The primary object of my invention is the provision of specially constructed front and rear seats of a passenger motor vehicle or automobile, which may be converted into an upper berth or bed, leaving the floor of the vehicle unobstructed so that it may also be utilized for sleeping purposes, thus providing an upper and lower berth in the car capable of accommodating four persons when so used, and especially constructed in order that the seats may with facility and dispatch be converted when required.

The invention consists in certain novel combinations and arrangements of hinged-sectional seats which may be extended as will be described, and also in novel features of construction for retaining and supporting the seat sections in normal position as well as in their positions when converted for use as a berth.

In the accompanying drawings I have illustrated one complete example of the physical embodiment of my invention constructed and arranged according to the best mode I have so far devised for the practical application of the principles of my invention.

Figure 1 is a longitudinal vertical sectional view of the body of an automobile, disclosing sufficient of the construction or structure thereof for the purpose of illustrating my invention, and showing the sectional hinged seats and connections in normal position.

Fig. 2 is a view similar to Fig. 1 with the seats in position illustrating the movement of parts.

Fig. 3 is a transverse sectional view showing the front seat brace.

Fig. 4 is a detail perspective of a portion of Fig. 3.

Fig. 5 is a sectional view of a car showing the upper and lower berths made up.

Fig. 6 shows the lower berth prepared for use and the rear seat sections moved out of the way for use of the lower berth.

Fig. 7 is a detail view in elevation of the seat locking device, to co-act with the hinged sections in either of their operative positions.

Fig. 8 is a top plan view of the device of Fig. 7.

In the preferred form of the invention illustrated in the drawings I have utilized, for purposes of exemplification, a conventional form or type of automobile body 1 the bottom 2 of which is supported on the frame members as usual, and is fashioned with front and rear side doors respectively.

In converting the automobile equipment according to my invention, the rear seat is made up of three sections 3, 4 and 5, of which the back board or section 3 is pivoted at 6 at the upper edge of the rear end of the car body, the pivot or hinge being a horizontal one to suspend the seat back in normal position, and permit an upward swing of this section when desired.

The seat bottom or section 4 is hinged at 7 to the seat back 3, and this horizontally disposed seat portion is held stationary and rigid by means of one or more hooks 8 secured on its underside and projecting to the rear in order to engage in complementary eyes 9 fixed in proper position on the back wall of the car body. In this manner the seat bottom 4 with its cushions C is suspended and supported from the hinges 6, and held rigidly in horizontal position by the hooks 8 and eyes 9. The seat bottom is also directly supported, from beneath, by the front board or section 5 that is hinged to the bottom at 10 and rests on the floor, in vertical position as shown in Fig. 1. The front board 5 is rigidly held between the two side walls of the car body by means of the pair of slide bolts 11, 12 slidably supported in bearings 13 on the rear face of the board and adapted to engage in sockets in the respective side walls. The two bolts are operated by turning the knob 14, whose spindle 15 projects through the foot board 5, and is accessible to be turned from the front side of the board by means of the arm 16, and pivoted links 17 connected to the bolts 11 and 12. Thus the knob may be turned to insert the bolts in their sockets in the side walls of the car for locking the foot board in place, or turned in opposite directions for freeing the bolts in order that the board may be unlocked when desired. I preferably utilize a pivoted detent 18 (Fig. 7) for holding the bolts in locked position, which detent is withdrawn from engagement with the lug 19 on one of the bolts 12 preparatory to unlocking the bolts, by turning the knob 20, which is connected to the detent by the pivoted link 21, the spindle 22 of the knob projecting through the board 5 in manner similar to that of spindle 15. As thus described it is apparent that the sectional rear seat member is adapted for ordinary use and presents the ordinary appearance of the customary rear seat of an automobile when utilized for that purpose, but in addition, the sections of the rear seat may be converted for use as a berth, as will be described in connection with the front seat construction.

In converting or equipping the automobile for use with my invention, I employ a transversely disposed, rectangular frame, indicated as a whole by the numeral 23 in Fig. 3 in the form of an oblong, and preferably made up of metal which may be of sheet construction or wrought to form as desired. This frame is fashioned as a transverse brace for the body of the car at the rear of the front seat, and at the upper edge of the frame is a hinged plate 24, which folds down on top of the frame as in Fig. 1 when in normal position, but may be turned back on its hinges 25 to positions as in Figs. 2, 5, and 6, when the seats are to be used as beds.

The frame 23, it will be understood, is positioned transversely of the automobile, and is bolted or otherwise secured to the sides and bottom of the car to form a rigid portion thereof, and in the absence of the usual fixed ordinary front seat construction, performs the function of the seat in that it provides a rigid and fixed brace between the front and rear ends of the body of the car.

The front seat of the car comprises the back board or seat back 26, a bottom section or seat bottom 27, and the fixed, immovable board 28, the seat back being retained in normal position by the flange 29 of plate 24 in Fig. 1, while the seat board 27 is hinged to the back at 30.

A hook and eye construction similar to 8 and 9 for the rear seat, is provided for the front seat, to attach the back to the frame 23 which carries the eyes, to hold the seat back, in normal position, rigid with the frame 23, and a pair of slide bolts 31 and connections similar to the bolts 11 and 12 are carried by the bottom board to lock the seat bottom to the sides of the car.

Front board 28 which is fixed to the bottom and sides of the car, forms the main support for the front seat when in normal position, as indicated, and the seat bottom, and its forward edge rests upon the front board for support.

The sectional front seat members are utilized to form the bottom end of the berth when the car seats are converted for sleeping purposes, and when swung up to horizontal position as in Fig. 5, these seat sections form a flush continuation of the rear seat sections, with section 26 resting upon the intermediate frame box and held rigid by the flange 29 of plate 24. Thus the boards 26—27 of the front seat are swung and lifted to horizontal position, the back 26 resting on frame 23, and to secure the parts the sliding bolts 31 are inserted in their sockets 32, provided in the front doors if necessary, to support these seat sections in the same manner that the rear seat sections are supported by their bolts in their sockets 33 in the sides of the car body just to the rear of the front seat. A spring latch 34 and keeper 35' are utilized at the joints to prevent sagging of the parts of the berth.

These spring latches and keepers are used at the sides of the car and attached to adjoining members of the section, as between sections 4 and 5, thus providing a rigid and stable support for the bedding that is made up of the cushion members C of the front and back seats.

The converted front and rear seats thus form an upper berth for sleeping purposes, and when so utilized, the floor of the car is unobstructed, as will be apparent, by removal of the entire rear seat, and all of the front seat except the fixed front board 28, which is stationary and forms the foot-board of the bed that may be made up on the bottom of the car.

The lower berth or bed is made up of two foldable panels 35 and 36 the latter hinged at 37 to the bottom of the car within the frame 23, and the former hinged at 38 to panel 36. Thus, these panels may fold up as in Fig. 1 to close the space within the frame 23 which forms a compartment for the bedding C' of the lower berth, and when extended at full length as in Figs. 5 and 6 they form, with the bedding C' a lower berth with a head-board 39, at the rear of the car. In Figs. 5 and 6 the lower berth is shown made up with the cushions or bedding C' extending from the rear end of the car to seat board 28.

In Fig. 5 both front and rear seats are utilized and both beds or berths are prepared for use, while in Fig. 6 the front seat is in normal position for its usual functions and the rear seat is moved to position out of the way for the lower berth to be used as made up. In Fig. 6 the rear seat sections are suspended between the hinge 6 and the hinged plate 24 on the brace 23.

Changes and alterations may be made in the structure within the scope of my claims without departing from the spirit of my invention, and parts may be utilized to perform other functions not specified herein as will be understood.

What I claim as new and desire to secure by Letters Patent is—

1. The combination with the sectional hinged rear seat members pivoted to the rear of the car and means for supporting said sections in horizontal position, of a front seat comprising a back supported in the car, a seat bottom pivoted to the back, a transverse frame at the rear of the front seat, a hinged plate on said frame having an engaging flange to hold said seat back in normal position, means for attaching the seat bottom to the sides of the car, and said seat back and bottom adapted to be moved to horizontal position to form a continuation of the front seat sections, for the purpose described.

2. The combination with the longitudinally extensible rear seat sections, an open transverse frame, and pivoted plate thereon, of a front seat comprising a back section retained in normal position by said plate, a seat bottom pivoted to the back section, a fixed front section supporting the seat bottom, said seat back adapted to be horizontally disposed over the frame, and means for supporting the seat bottom to form a continuation of the rear seat sections and the front seat back section as described.

3. The combination with a car and the pivotally supported rear seat having horizontally extensible sections and supporting means therefor, of an open, transverse frame, a plate hinged on said frame to swing over its top, a front seat back and an engaging flange on the frame to hold said seat back in normal position, a seat bottom hinged to said back, a front supporting board for the bottom, said back and bottom adapted to swing to horizontal position to form a continuation of the rear seat sections with the back resting on frame, slide bolts for supporting some of the section, and spring latches for supporting some of the hinged sectional joints.

LORENZO B. WELCH.